(12) United States Patent
Bowman et al.

(10) Patent No.: US 8,237,725 B1
(45) Date of Patent: Aug. 7, 2012

(54) VERTEX CACHE MAP MODE FOR PER-VERTEX STATE CHANGES

(75) Inventors: James C. Bowman, Pescadero, CA (US); Dane T. Mrazek, Redwood City, CA (US); Sameer M. Gauria, Santa Clara, CA (US)

(73) Assignee: NVIDA Corporation, Santa Clara, CA (US)

( * ) Notice: Subject to any disclaimer, the term of this patent is extended or adjusted under 35 U.S.C. 154(b) by 962 days.

(21) Appl. No.: 11/935,239

(22) Filed: Nov. 5, 2007

(51) Int. Cl.
*G09G 5/36* (2006.01)

(52) U.S. Cl. ........................ 345/557; 345/502; 345/530

(58) Field of Classification Search ........... 345/531–574
See application file for complete search history.

(56) References Cited

U.S. PATENT DOCUMENTS

| | | | |
|---|---|---|---|
| 5,920,326 A * | 7/1999 | Rentschler et al. ........... | 345/503 |
| 6,433,788 B1 * | 8/2002 | Morein ........................ | 345/557 |
| 6,570,573 B1 * | 5/2003 | Kazachinsky et al. ........ | 345/558 |
| 6,628,836 B1 * | 9/2003 | Wittenbrink et al. ......... | 382/232 |
| 6,791,559 B2 * | 9/2004 | Baldwin ....................... | 345/557 |
| 6,889,289 B2 * | 5/2005 | Crook et al. .................. | 711/118 |
| 6,972,769 B1 * | 12/2005 | Nebeker et al. .............. | 345/552 |
| 7,002,586 B2 * | 2/2006 | Chiu et al. .................... | 345/505 |
| 7,015,913 B1 * | 3/2006 | Lindholm et al. ............ | 345/501 |
| 7,071,935 B1 * | 7/2006 | Deering et al. ............... | 345/419 |
| 7,106,336 B1 * | 9/2006 | Hutchins ...................... | 345/530 |

\* cited by examiner

*Primary Examiner* — Xiao M. Wu
*Assistant Examiner* — Charles Tseng
(74) *Attorney, Agent, or Firm* — Patterson & Sheridan, LLP.

(57) ABSTRACT

A vertex cache within a graphics processor is configured to operate as a conventional round-robin streaming cache when per-vertex state changes are not used and is configured to operate as a random access storage buffer when per-vertex state changes are used. Batches of vertices that define primitives and state changes are output to parallel processing units for processing according to vertex shader program. In addition to allowing per-vertex state changes, the vertex cache is configured to store vertices for primitive topologies that use anchor points, such as triangle strips, line loops, and polygons.

20 Claims, 8 Drawing Sheets

| Input | Contents of Primitive Buffer 420 | Contents of Vertex Slots 430 |
|---|---|---|
| Index 520 | Index 520 | |
| Index 521 | Index 520, 521 | Index 520, 521 |
| Index 522 | Index 520, 521, 522 | Index 520, 521, 522 |
| Index 523 | Index 520, 523, 522 | Index 520, 521, 522, 523 |
| Index 524 | Index 520, 523, 524 | Index X, X, X, X<br>Index 520, 523, 522<br>Index 520, 523, 524 |

Column 800, Column 810, Column 820

Figure 8

VERTEX CACHE MAP MODE FOR PER-VERTEX STATE CHANGES

BACKGROUND OF THE INVENTION

1. Field of the Invention

The present invention generally relates to graphics technology for generating vertex and primitive information in a graphics system. More particularly, the present invention is directed towards generating vertex and primitive information in a graphics system when per-vertex state changes exist.

2. Description of the Related Art

Current graphics processors use a vertex cache to store recently used vertices that define primitives to be rendered. Since a single vertex is oftentimes reused to define more than one primitive the cache is an efficient storage mechanism. The vertex cache is typically a round-robin streaming cache that does not accommodate changes in vertex processing state. Since conventional vertex processing programs do not change the vertex processing state on a per-vertex level, i.e., within a primitive, a round-robin streaming cache is an effective storage mechanism with the oldest vertex being overwritten by the newest vertex.

More recently, the OpenGL graphics API allows per-vertex state changes. Conventional vertex caches are not configured to support per-vertex state changes. Accordingly, what is needed in the art is a system and method for providing the efficient storage benefits of vertex caching while allowing per-vertex state changes.

SUMMARY OF THE INVENTION

A vertex cache within a graphics processor is configured to operate as a conventional round-robin streaming cache when per-vertex state changes are not used and is configured to operate as a random access storage buffer when per-vertex state changes are used. Batches of vertices that define primitives and state changes are output to parallel processing units for processing according to vertex shader program. In addition to allowing per-vertex state changes, the vertex cache is configured to store vertices for primitive topologies that use anchor points, such as triangle strips, line loops, and polygons.

Various embodiments of a method of the invention for loading vertex slots with vertex information include receiving first vertex information for a first vertex of a primitive, storing the first vertex information in a primitive buffer, and receiving second vertex information for a second vertex of a primitive. When a vertex state change has occurred within the primitive and after the first vertex information was stored in the primitive buffer, vertex slots are flushed to initiate processing of a first batch of vertices by a vertex shader, and the vertex state change is output to configure the vertex shader for processing subsequent vertices.

Various embodiments of the invention for a computing system configured to assemble vertex information include a multithreaded processing core and a data assembler. The multithreaded processing core includes vertex slots and a vertex shader that is configured to process vertex information stored in the vertex slots according to a vertex shader program. The data assembler includes a primitive buffer and is coupled to the multithreaded processing core. The data assembler is configured to receive the vertex information for a vertices of a primitive, store the vertex information in the primitive buffer, determine when a vertex state change occurs within the primitive, flush the vertex slots to initiate processing of a batch of vertices specified by the vertex information by the vertex shader, and output the vertex state change to configure the vertex shader for processing subsequent vertices.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 8 illustrates the contents of the primitive buffer and vertex slots when the polygon primitive is assembled in accordance with one or more aspects of the present invention.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
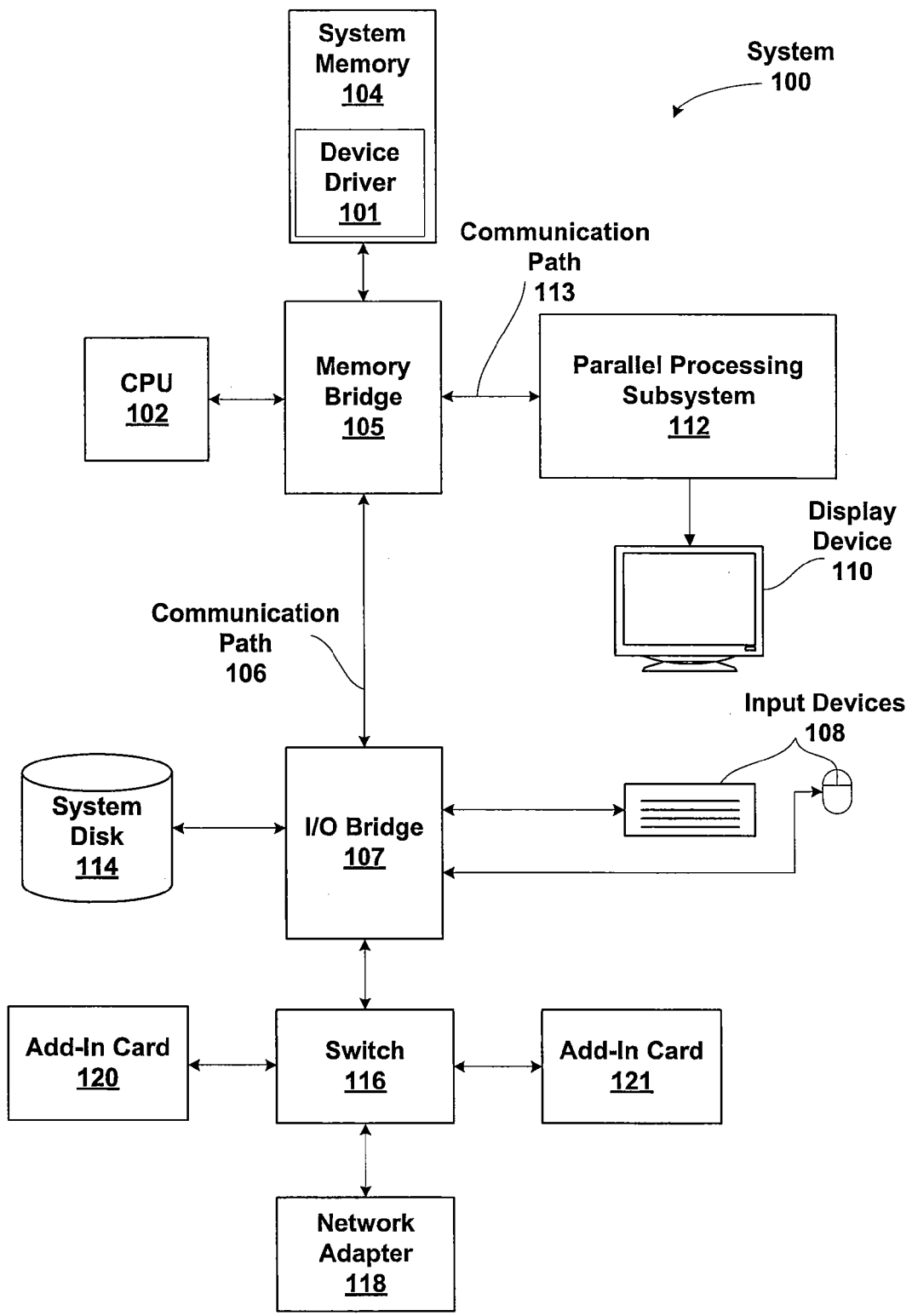
FIG. 1 is a block diagram illustrating a computer system configured to implement one or more aspects of the present invention.

FIG. 1 is a block diagram illustrating a computer system configured to implement one or more aspects of the present invention. FIG. 1 is a block diagram of a computer system 100 according to an embodiment of the present invention. Computer system 100 includes one or more central processing units (CPU) 102 and a system memory 104 communicating via a bus path that includes a memory bridge 105.

System memory 104 includes a device driver 101 that is configured to provide one or more instruction stream buffers that specify the location of data and program instructions to parallel processing subsystem 112. The data and program instructions may be stored in system memory 104 or memory within other devices of system 100. Device driver 101 is executed by CPU 102 to translate instructions for execution by parallel processing subsystem 112 based on the specific capabilities of parallel processing subsystem 112. The instructions may be specified by an application programming interface (API) which may be a conventional graphics API such as Direct3D or OpenGL.

Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or other communication path 113 (e.g., a PCI Express, Accelerated Graphics Port, or HyperTransport link). In one embodiment parallel processing subsystem 112 is a graphics subsystem that delivers pixels to a display device 110 (e.g., a conventional CRT or LCD based monitor).

A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

Figure 2:
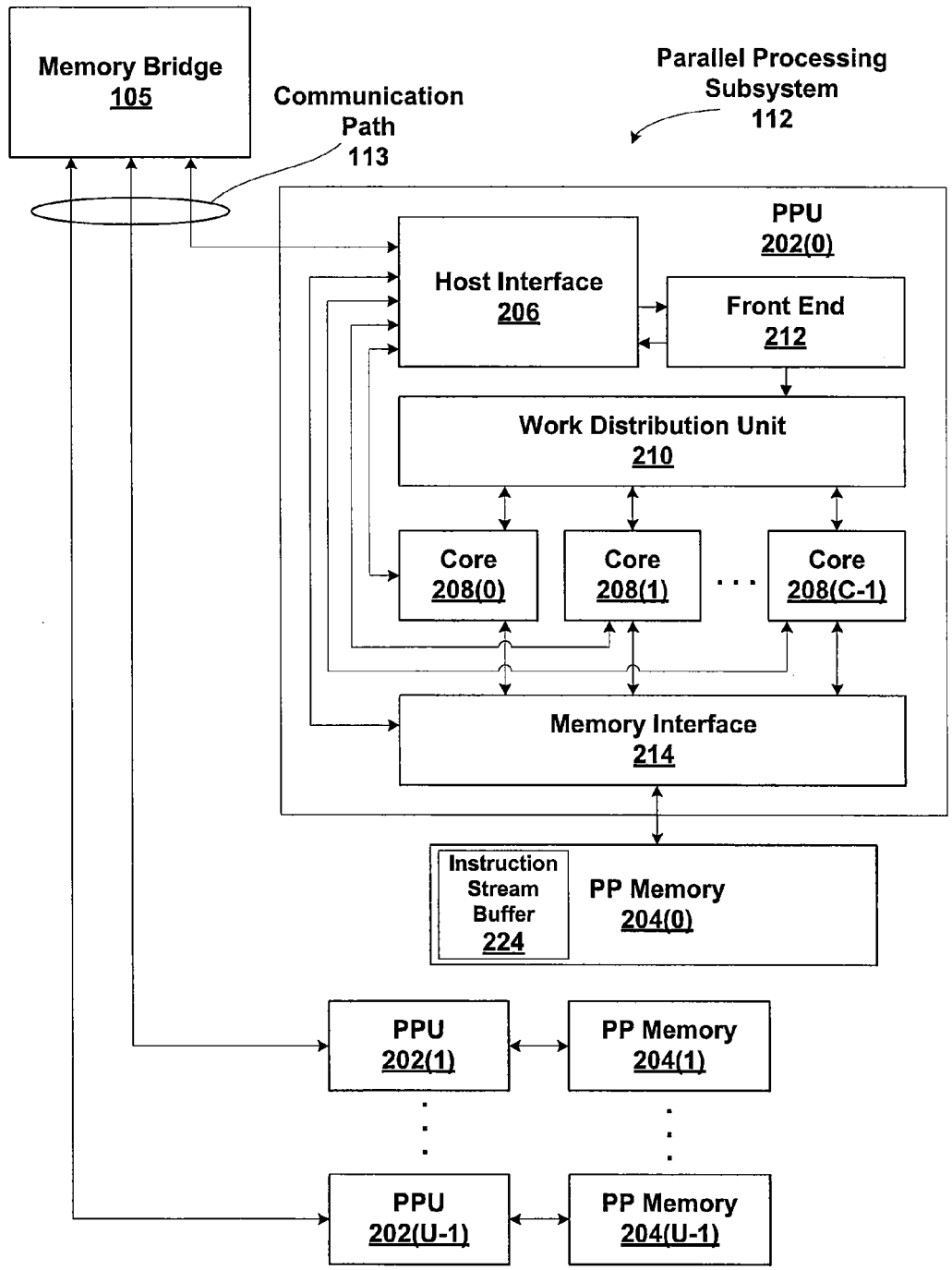
FIG. 2 is a block diagram of a parallel processing subsystem for the computer system of FIG. 1 in accordance with one or more aspects of the present invention.

An embodiment of parallel processing subsystem 112 is shown in FIG. 2. Parallel processing subsystem 112 includes one or more parallel processing units (PPUs) 202, each of which is coupled to a local parallel processing (PP) memory 204. A pushbuffer, shown as instruction stream buffer 224 that specifies the location of data and program instructions for execution by each PPU 202 may be stored in each PP memory 204. In general, a parallel processing subsystem includes a number U of PPUs, where $U \geq 1$. (Herein, multiple instances of like objects are denoted with reference numbers identifying the object and parenthetical numbers identifying the instance where needed.) PPUs 202 and PP memories 204 may be implemented, e.g., using one or more integrated circuit devices such as programmable processors, application specific integrated circuits (ASICs), and memory devices.

As shown in detail for PPU 202(0), each PPU 202 includes a host interface 206 that communicates with the rest of system 100 via communication path 113, which connects to memory bridge 105 (or, in one alternative embodiment, directly to CPU 102). In one embodiment, communication path 113 is a PCI-E link, in which dedicated lanes are allocated to each PPU 202 as is known in the art. Other communication paths may also be used.

Host interface 206 may perform any necessary translations of abstract graphics commands into a format required by graphics hardware. For example, host interface 206 may receive conventional graphics API calls from CPU 102, such as graphics API calls in accordance with conventional graphics languages for pipelined graphics architectures such as the OpenGL® API. Host interface 206 generates packets (or other signals) for transmission on communication path 113 and also receives all incoming packets (or other signals) from communication path 113 and directs them to appropriate components of PPU 202. For example, commands related to processing tasks may be directed to a front end unit 212 while commands related to memory operations (e.g., reading from or writing to PP memory 204) may be directed to a memory interface 214. Host interface 206 may be of generally conventional design, and a detailed description is omitted as not being critical to the present invention.

Each PPU 202 advantageously implements a highly parallel processor. As shown in detail for PPU 202(0), a PPU 202 includes a number C of cores 208, where $C \geq 1$. Each processing core 208 is capable of executing a large number (e.g., tens, hundreds, or thousands) of threads concurrently, where each thread is an instance of a program; one embodiment of a multithreaded processing core 208 is described below. A processing context encompasses a complete set of state through PPU 202, while a thread may encompass only the state required to shade a single pixel. Threads run inside processing contexts: one processing context might contain thousands of running threads. Cores 208 receive processing tasks to be executed via a work distribution unit 210, which receives commands defining processing tasks from a front end unit 212. Work distribution unit 210 can implement a variety of algorithms for distributing work. For instance, in one embodiment, work distribution unit 210 receives a "ready" signal from each core 208 indicating whether that core has sufficient resources to accept a new processing task. When a new processing task arrives, work distribution unit 210 assigns the task to a core 208 that is asserting the ready signal; if no core 208 is asserting the ready signal, work distribution unit 210 holds the new processing task until a ready signal is asserted by a core 208.

Cores 208 communicate with memory interface 214 to read from or write to various external memory devices. In one embodiment, memory interface 214 includes an interface adapted to communicate with local PP memory 204, as well as a connection to host interface 206, thereby enabling the cores to communicate with system memory 104 or other memory that is not local to PPU 202. Memory interface 214 can be of generally conventional design, and a detailed description is omitted.

Cores 208 can be programmed to execute processing tasks relating to a wide variety of applications, including but not limited to linear and nonlinear data transforms, filtering of video and/or audio data, modeling operations (e.g., applying laws of physics to determine position, velocity and other attributes of objects), image rendering operations (e.g., vertex shader, geometry shader, and/or pixel shader programs), and so on. PPUs 202 may transfer data from system memory 104 and/or local PP memories 204 into internal (on-chip) memory, process the data, and write result data back to system memory 104 and/or local PP memories 204, where such data can be accessed by other system components, including, e.g., CPU 102 or another parallel processing subsystem 112.

Referring again to FIG. 1, in some embodiments, some or all of PPUs 202 in parallel processing subsystem 112 are graphics processors with rendering pipelines that can be configured to perform various tasks related to generating pixel data from graphics data supplied by the pushbuffer via memory bridge 105 and bus 113, interacting with local PP memory 204 (which can be used as graphics memory including, e.g., a conventional frame buffer, instruction stream buffer 224, texture maps, and the like) to store and update pixel data, delivering pixel data to display device 110, and the like. In some embodiments, PP subsystem 112 may include one or more PPUs 202 that operate as graphics processors and one or more other PPUs 202 that are used for general-purpose computations. The PPUs may be identical or different, and each PPU may have its own dedicated PP memory device(s) or no dedicated PP memory device(s).

In operation, CPU 102 is the master processor of system 100, controlling and coordinating operations of other system components. In particular, CPU 102 issues commands that control the operation of PPUs 202. In some embodiments, CPU 102 writes a stream of commands for each PPU 202 to instruction stream buffer 224, and which may be located in system memory 104, PP memory 204, or another storage location accessible to both CPU 102 and PPU 202. PPU 202 reads the command stream from instruction stream buffer 224 and executes commands asynchronously with operation of CPU 102.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of PPU 202 to the rest of system 100 may also be varied. In some embodiments, PP system 112 is implemented as an add-in card that can be inserted into an expansion slot of system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

A PPU 202 may be provided with any amount of local PP memory, including no local memory, and may use local memory and system memory in any combination. For instance, a PPU 202 can be a graphics processor in a unified memory architecture (UMA) embodiment; in such embodiments, little or no dedicated graphics (PP) memory is provided, and PPU 202 would use system memory exclusively or almost exclusively. In UMA embodiments, a PPU 202 may be integrated into a bridge chip or processor chip or provided as a discrete chip with a high-speed link (e.g., PCI-E) connecting the PPU 202 to system memory, e.g., via a bridge chip.

As noted above, any number of PPUs 202 can be included in a parallel processing subsystem. For instance, multiple PPUs 202 can be provided on a single add-in card, or multiple add-in cards can be connected to communication path 113, or one or more of the PPUs 202 could be integrated into a bridge chip. The PPUs 202 in a multi-PPU system may be identical to or different from each other; for instance, different PPUs 202 might have different numbers of cores, different amounts of local PP memory, and so on. Where multiple PPUs 202 are present, they may be operated in parallel to process data at higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Graphics Pipeline Architecture

Figure 3:
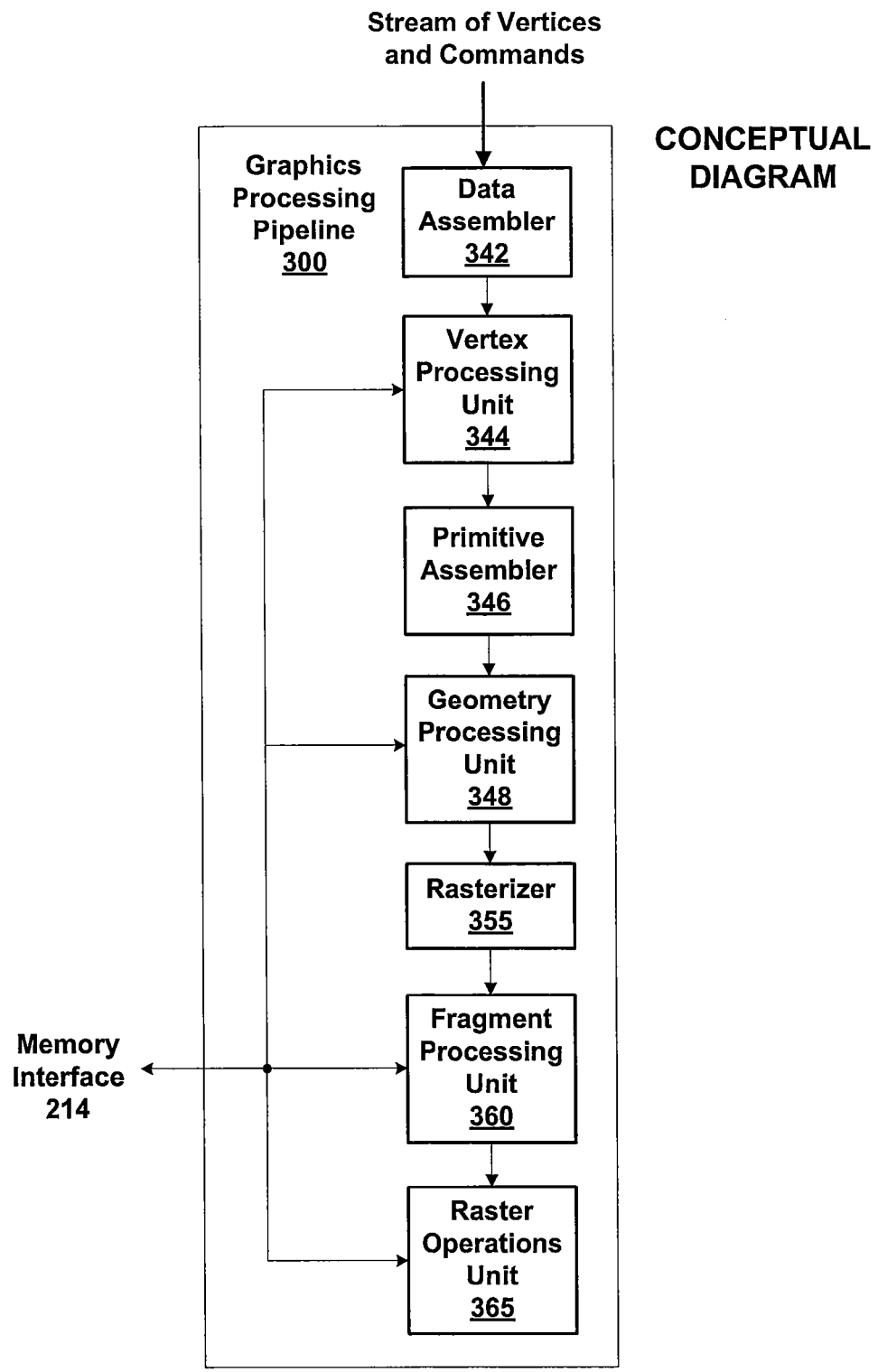
FIG. 3 is a conceptual diagram of a graphics processing pipeline in accordance with one or more aspects of the present invention.

FIG. 3 is a conceptual diagram of a graphics processing pipeline 300, in accordance with one or more aspects of the present invention. PPU 202 may be configured to form a graphics processing pipeline 300. For example, core 208 may be configured to perform the functions of a vertex processing unit 344, geometry processing unit 348, and a fragment processing unit 360. The functions of data assembler 342, primitive assembler 346, rasterizer 355, and raster operations unit 365 may also be performed by core 208 or may be performed by host interface 206, front end 212, or work distribution unit 210. Instruction stream buffer 224 may include one or more of a vertex shader program, geometry shader program, and fragment shader program for execution by PPU 202.

Data assembler 342 is a fixed function unit that collects indices corresponding to vertex data for high-order surfaces, primitives, and the like, and outputs the vertex indices in batches to vertex processing unit 344. In conventional systems, a round-robin streaming cache is used to store the batches of vertex indices. In order to allow per-vertex state changes, randomly accessible vertex slots are included within each core 208 that is configured to function as a vertex processing unit 344 to store the vertex indices, as described in conjunction with FIG. 4.

Vertex processing unit 344 is a programmable execution unit that is configured to execute vertex shader programs, transforming vertex data as specified by the vertex shader programs. For example, vertex processing unit 344 may be programmed to transform the vertex data, specified by the vertex indices, from an object-based coordinate representation (object space) to an alternatively based coordinate system such as world space or normalized device coordinates (NDC) space. Vertex processing unit 344 may read data that is stored in PP memory 204 through memory interface 214 for use in processing the vertex data.

Primitive assembler 346 receives processed vertex data from vertex processing unit 344 and constructs graphics primitives, e.g., points, lines, triangles, or the like, for processing by geometry processing unit 348. Geometry processing unit 348 is a programmable execution unit that is configured to execute geometry shader programs, transforming graphics primitives received from primitive assembler 346 as specified by the geometry shader programs. For example, geometry processing unit 348 may be programmed to subdivide the graphics primitives into one or more new graphics primitives and calculate parameters, such as plane equation coefficients, that are used to rasterize the new graphics primitives. Geometry processing unit 348 outputs the parameters and new graphics primitives to rasterizer 355. Geometry processing unit 348 may read data that is stored in PP memory 204 through memory interface 214 for use in processing the geometry data.

Rasterizer 355 scan converts the new graphics primitives and outputs fragments and coverage data to fragment processing unit 260. Fragment processing unit 360 is a programmable execution unit that is configured to execute fragment shader programs, transforming fragments received from rasterizer 355 as specified by the fragment shader programs. For example, fragment processing unit 360 may be programmed to perform operations such as perspective correction, texture mapping, shading, blending, and the like, to produce shaded fragments that are output to raster operations unit 365. Fragment processing unit 360 may read data that is stored in PP memory 204 through memory interface 214 for use in processing the fragment data. Memory interface 214 produces read requests for data stored in graphics memory, decompresses any compressed data, and performs texture filtering operations, e.g., bilinear, trilinear, anisotropic, and the like. Raster operations unit 365 is a fixed function unit that optionally performs near and far plane clipping and raster operations, such as stencil, z test, and the like, and outputs pixel data as processed graphics data for storage in graphics memory. The processed graphics data may be stored in graphics memory, e.g., PP memory 204, and/or system memory 104, for display on display device 110.

Vertex and Primitive Caches

Figure 4:
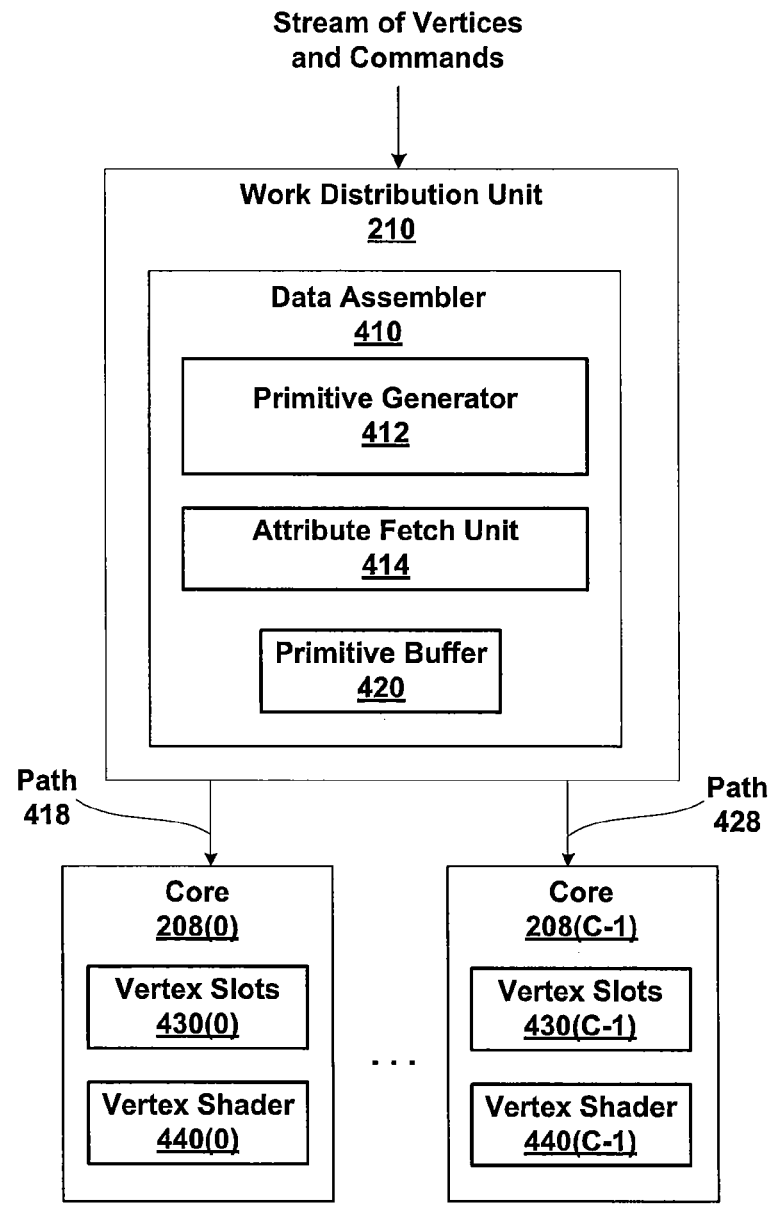
FIG. 4 is a block diagram of portions of the PPU of FIG. 2 in accordance with one or more aspects of the present invention.

FIG. 4 is a block diagram of portions of the PPU 202 of FIG. 2, in accordance with one or more aspects of the present invention. Cores 208 within PPU 202 may be configured to perform the functions of one or more of the processing units shown in FIG. 2. For purposes of this description, core 208 is configured to perform the functions of vertex processing unit 344.

A data assembler unit 410 receives a serial stream of vertices and commands from host interface 206. As an illustrative example, the serial stream may include a "to do" list for a set of vertices and a command indicating operations to be performed on the vertices, such as a triangle strip command, a point command, a line command, a triangle command, a line strip command, a line loop command, a quad command, or a polygon command. The "to do" commands thus provide instructions for generating primitives from vertices.

Data assembler unit 310 includes a primitive generator unit 412 to perform at least an initial stage of primitive assembly in which primitives are identified based on input vertices and commands. An attribute fetch unit 414 is provided to fetch information for identified vertices. For example, attribute fetch unit 414 may access vertex attributes from a vertex cache or other resource. As described below in more detail, data assembler unit 410 accumulates vertex indices in a primitive buffer 420 and writes batches of work to cores 208 based on an initial identification of primitives belonging to a set of vertices. The batches of work are processed independently by cores 208 and each batch is dispatched to a single core 208 via path 418 or 428.

As previously described, PPU 202 is implemented with a highly scalable architecture for performing vertex processing and geometry processing operations required to generate a representation of primitive in screen space, rasterize primitives, and perform other steps required to render pixels for display. In one embodiment, cores 208 0 through C-1 are configured to perform vertex and geometry processing operations, where C is a whole number at least equal to three. Each core 208 includes a vertex buffer with vertex slots 430 for buffering a set of vertex indices and a vertex shader 440 for performing vertex processing. Note that vertex shader 440 may be configured to perform geometry shading and/or fragment shading operations to execute vertex shader programs, geometry shader programs, and/or fragment shader programs. In one embodiment there are 32 slots per vertex slots 430, although more generally there may be an arbitrary number depending on the implementation. Vertex shader 440 may be configured to process multiple threads in parallel, such as for example 8 threads.

Each core 208 operates independently of the other cores 208 and does not share vertex information from its vertex slots 430. Thus, for example, core 208(0) utilizes indices in vertex slots 430(0) to perform vertex processing operations on a set of primitives, i.e., batch of work. However, in this example, core 208(0) has no knowledge of the vertices in the vertex slots 430(C-1) of core 208(C-1). This partitioning of functionality facilitates a highly scalable architecture. However, one consequence of the lack of vertex sharing between parallel vertex/geometry processors is that work should be efficiently allocated to each individual core 208 as independent units of work.

As illustrated in FIG. 4, data assembler unit 410 converts a serial stream of vertices and commands into batches of work assigned to an available core 208. Each batch includes a list of primitives assigned to the batch along with a set of vertex indices for the primitives. That is, data assembler performs at least an initial stage of primitive assembly in terms of identifying primitives (e.g., triangles, polygons) and a corresponding set of vertex indices such that vertex information can be sent in batches. To perform this task, data assembler 410 preferably incorporates several rules. One rule is that a batch has a pre-selected maximum number of vertex indices. For example, the maximum number of vertex indices per match may be determined by the size of each vertex slots 430. Another rule is that primitives can't span batches. In other words, a batch includes an identification of all of the vertex indices necessary for the set of primitives associated with the batch. Other optional rules may also be included, such as a rule defining a limit on the number of primitives per batch. A result of the rules is that an available core 208 that receives a set of vertex indices assigned to its vertex slots 430 can perform vertex/geometry processing without having to communicate with other cores 208 for vertex data.

Figure 5:
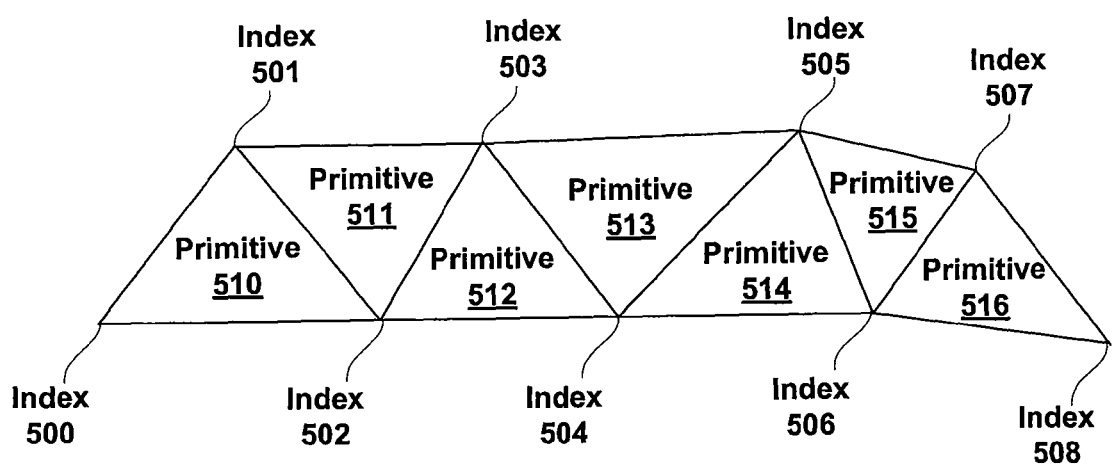
FIG. 5 illustrates primitives specified as a triangle strip.

FIG. 5A illustrates primitives specified as a triangle strip and that each batch includes the vertex indices needed to process that batch. Referring to FIG. 5, as an illustrative example, suppose that a batch size corresponds to four vertex indices and that a triangle strip is being processed having a set of ascending order vertex indices (e.g., indices 500, 501, 502, 503, 504, 505, 506, 507, and 508 for a strip). In this illustrative example, an initial batch, batch 0 has vertices 500, 501, 502, and 503. A corresponding set of triangles is primitive 510 and primitive 511. A second batch, batch 1, has vertices 502, 503, 504, and 505. The corresponding set of triangles for the second batch is primitive 512 and primitive 513. A third batch has vertices 504, 505, 506, 507 and primitives 514 and 515.

Vertex indices are accumulated in primitive buffer 420 and "flushed" to output a batch to a core 208. In one embodiment data assembler 410 implements the batch rules to make flush/no flush decisions as primitives are collected by primitive generator 412. For example, the primitive assembly may be performed sequentially based on the input commands, i.e., from a set of input vertex indices one primitive is identified, then another, and another, and so on. For each primitive that is identified, a lookup operation is performed on the vertex indices of the primitive and then a batch decision is made consistent with the batch rules. For example, at some initial starting time, a new batch is started. As each additional primitive is collected, a decision is made for the additional primitive whether adding it to the batch is consistent with the batch rules, such as a limit on a total number of vertex indices per batch and primitives not spanning different batches. When additional primitives can no longer be added to a batch, the batch is flushed (i.e., the old batch is written to an available core 208 and a new batch begun). In one implementation, all of the lookups for a primitive (e.g., three lookups for the case the primitive is a triangle) are performed in a single clock cycle.

As another illustrative example, consider an example in which the primitives are triangles and there is a triangle list. In this example, assume a batch size of 8 vertex indices, indices 500, 501, 502, 503, 504, 505, 506, and 507 and a triangle list for drawing primitives 510, 511, 512, 513, 514, and 515. A first primitive, primitive 510 with vertex indices 500, 501, and 502 is added to the new batch. Vertex indices 500, 501, and 502 are thus already cached in primitive buffer 420. As a second primitive arrives, primitive 512 with vertex indices 502, 503, and 504 it can be added to the batch by writing vertex indices 503 and 504, i.e., with a batch size of eight, caching five vertex indices 500, 501, 502, 503, and 504 as a batch provides the necessary information for processing primitives 510 and 512. Consider now that a batch has previously had six vertex indices added to the batch. Since there are six entries and a batch size of eight, only two new vertex indices may be written for the batch. Suppose then that the next primitive identified by data assembler 410 is a new primitive including none of the vertex indices in the six entries. In this example, there is insufficient room in the batch to add the new primitive. As a result, the old batch is flushed and then a new batch is started beginning with the vertex indices for the new primitive.

Importantly, an initial stage of primitive stage is performed before slot assignment of vertex information for vertex/geometry processing. That is, batch generation is primitive-oriented in order to produce an efficient allocation of work to the different cores 208. The primitive-oriented approach results in batches that are as full as they can possibly be without reordering the original input stream. In contrast, if a conventional vertex-oriented scheme was used in which vertex slots were assigned prior to primitive assembly, batch assignment would have to be designed with a large margin to account for the worst case number of missed for a primitive, resulting in large inefficiencies.

Per-Vertex State Changes

As previously described, a conventional vertex buffer does not allow for state changes within a primitive since the vertex information is stored in a streaming buffer with the oldest vertex information being replaced with the newest vertex information. When the state information for processing a primitive changes within the primitive, i.e., between vertices, the loading of vertex slots 430 changes from a "normal" streaming buffer mode to a "map" mode where data assembler 410 specifies the slot in vertex slots 430 that each vertex index is written into. Vertex slots 430 is flushed each time that the vertex processing state changes in order to process the pre-state change vertices with the previous state information. Therefore, the batch sizes are smaller and processing throughput is reduced when the map mode is used to write vertex slots 430. Consequently, it is desirable to enter map mode only when it is needed to process state changes and exit map mode to return to normal mode when there are no state changes.

Figure 6:
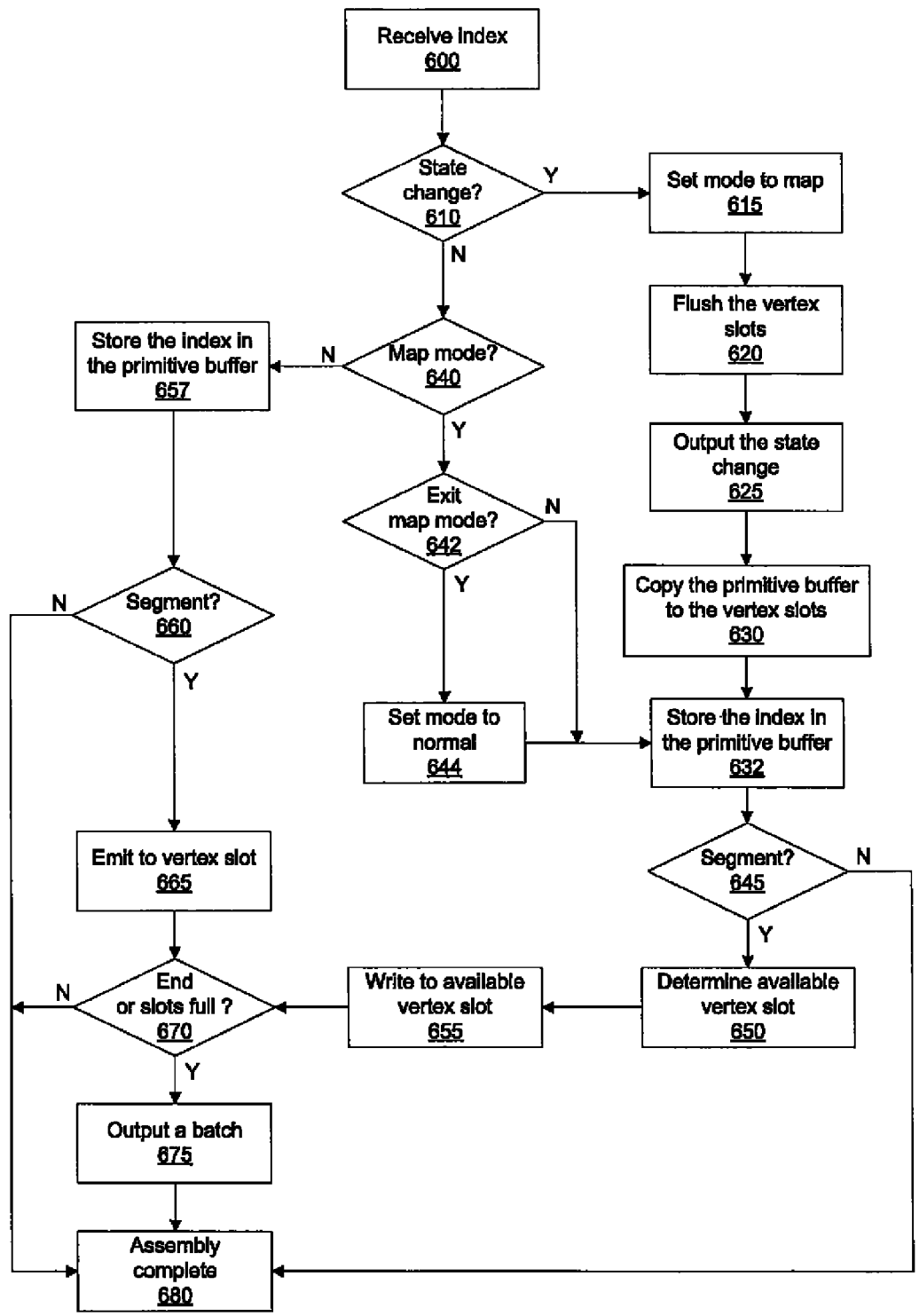
FIG. 6 is a flow diagram of method steps for loading vertex slots in accordance with one or more aspects of the present invention.

FIG. 6 is a flow diagram of method steps for loading vertex slots 430, in accordance with one or more aspects of the present invention. In step 600 a vertex index is received by data assembler 410. In step 610, data assembler 410 determines if a vertex state change has occurred since any previously received vertex index was stored in primitive buffer 420. A vertex state change is indicated when vertex processing command modifies the configuration of cores 208 to change how the vertices are processed. An example of an event that results in a vertex state change is resizing or moving a desktop window appearing on display device 110. Traditionally, vertex state changes within a primitive did not appear in the stream of vertices and commands received by work distribution unit 210. However, more recently graphics APIs allow state changes to occur within a primitive, i.e., allow per-vertex state changes.

If, in step 610 data assembler 410 determines that a vertex state change has not occurred, then in step 640 data assembler 410 determines if the map mode is the current processing mode for vertex indices. If, the map mode is not the current mode, i.e., the normal mode is the current mode, then in step 657 the vertex index is stored in primitive buffer 420. In step 660 data assembler 410 determines if the vertex corresponding to the vertex index completes a segment of a primitive, where a segment is defined as a line connecting two vertices of a primitive. Otherwise, if the map mode is the current mode, data assembler 410 proceeds to step 632. If, in step 660 data assembler 410 determines that the vertex index does not complete a segment of a primitive, then the assembly of the vertex index is complete and data assembler 410 proceeds to step 680.

If, in step 660 data assembler 410 determines that the vertex index does complete a segment of a primitive, then in step 665 primitive buffer 420 emits the vertex index to a vertex slot within one of vertex slots 430. A batch is assembled in vertex slots 430 using vertex indices that are emitted from primitive buffer 420 and processing of the vertex indices stored in the vertex slots 430, the batch, is initiated when vertex slots 430 are flushed by data assembler 410. When the normal mode is used, emitted vertex indices are stored in the oldest slot, so it is not necessary to specify a slot with the emitted vertex index.

In step 670 data assembler 410 determines if the vertex index is the last vertex index in a program or if all of the slots in vertex slots 430 are full, and, if so, in step 675 data assembler 410 flushes vertex slots 430 to output the batch of vertex indices for processing and proceeds to step 680. If, in step 670 data assembler 410 determines that the vertex index is not the last vertex index in a program and all of the slots in vertex slots 430 are not full, then data assembler 410 proceeds directly to step 680.

If, in step 610 data assembler 410 determines that a vertex state change has occurred, then in step 615 data assembler 410 sets the current mode to map mode. In step 620 data assembler 410 flushes vertex slots 430 to initiate processing of the vertex indices in the current batch using the current state. In step 625 data assembler 410 outputs the state change to the next core 208 that will receive a batch of vertex indices. In step 630 data assembler 410 copies the vertex indices in primitive buffer 420 to vertex slots 430 in the next core 208. The vertex indices that are copied are those that may be reused to define a new primitive, such as a segment of a triangle in a triangle strip, a segment of a polygon, or a closing segment of a line loop, as described in conjunction with FIGS. 7 and 8.

In step 632 the vertex index is stored in primitive buffer 420. In step 645 data assembler 410 determines if the vertex index completes a segment of a primitive, and, if not, then the assembly of the vertex index is complete and data assembler 410 proceeds to step 680. Otherwise, in step 650 data assembler 410 determines which slot in vertex slots 430 should be overwritten with the vertex index. One or more of the copied vertex indices are not needed to define a new primitive, and slots storing those vertex indices should be overwritten with new vertex indices. In step 655 primitive buffer 420 writes the vertex index to an available vertex slot within one of vertex slots 430. When the map mode is used, each vertex index output by primitive buffer 420 is written to a particular slot in vertex slots 430, so it is necessary to specify a slot with the vertex index. After writing the slot, data assembler 410 proceeds to step 670 to determine whether or not to flush vertex slots 430.

Figure 7:
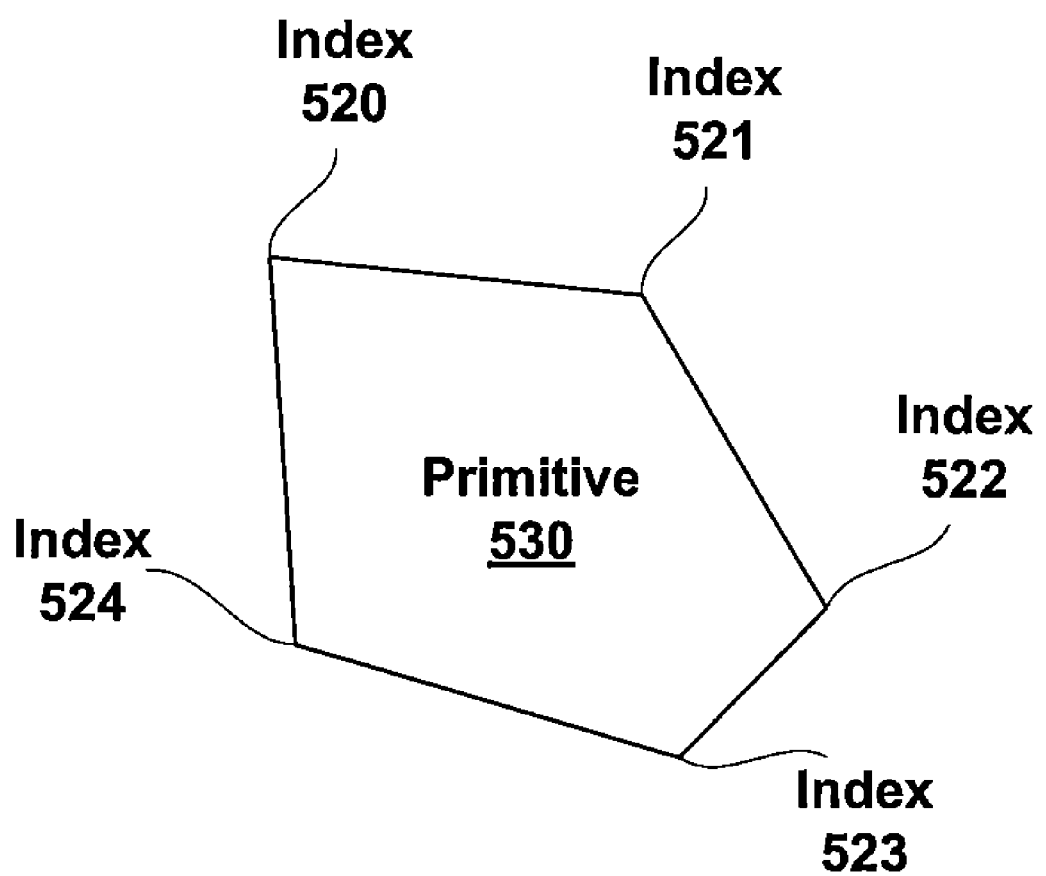
FIG. 7 illustrates a polygon primitive.

FIG. 7 illustrates a polygon primitive, primitive 530 that is defined by vertex indices 520, 521, 522, 523, and 524. Vertex index 520 is an anchor index since it is the first and the last vertex index of primitive 530 by virtue of being the first vertex index received by data assembler 410 for primitive 530. When primitive 530 is specified as a line loop with index 520 as an anchor index, a closing segment is produced to link the last index (index 524) to the anchor index.

FIG. 7 illustrates the contents of primitive buffer 420 and vertex slots 430 when a polygon primitive is assembled, in accordance with one or more aspects of the present invention. Column 800 lists the vertex indices, e.g., index 520, 521, 522, 523, and 524, in the order that they are received by data assembler 410. Column 810 lists the contents of primitive buffer 420 and column 820 lists the contents of vertex slots 430. When a first vertex index, index 520 (an anchor index for primitive 530) is received, it is stored in primitive buffer 420. A second index, index 521 is then received and stored in primitive buffer 420. Since index 521 completes a segment of primitive 530, index 520 and 521 are emitted to vertex slots 430. Note, that since a vertex state change has not been received, the current mode is the normal mode.

A third vertex index, index 522 is received and stored in primitive buffer 420. Since index 522 completes another segment of primitive 530, it is emitted to vertex slots 430. A fourth vertex index, index 523 is received and stored in primitive buffer 420, overwriting index 521, since that index will not be reused to form another primitive. Because index 523 completes another segment of primitive 530 it is emitted to vertex slots 430. For the purposes of this example, vertex slots 430 includes four slots, so after index 523 is emitted, vertex slots 430 is full and data assembler 410 flushes vertex slots 430. The contents of the slots are shown as X, X, X, X since the current batch is completed and a new batch will be started with the next vertex index. Since the workload is distributed between the different cores 208, a different vertex slots 430 may receive the new batch.

A vertex state change occurs following the fourth vertex index. Then a fifth vertex index, index 524 is received. Since a state change occurred, vertex slots 430 should be flushed. However since vertex slots 430 was already flushed that action is not repeated. The current state is changed from normal to map and the contents of primitive buffer 420 are copied into slots of vertex slots 430. Specifically, indices 520, 523, and 522 are copied from primitive buffer 420 to vertex slots 430. Note that index 522 is not needed in vertex slots 430 since the segment defined by index 522 and 523 was included in the last batch. Therefore, index 522 should be overwritten and is determined to be available as such by data assembler 410. Index 524 is stored in primitive buffer 420 and since it completes a segment of primitive 530, primitive buffer 420 writes index 524 to the slot occupied by index 522. Finally, the contents of vertex slots 430 are indices 520, 523, and 524. Since primitive 530 is complete, vertex slots 430 may be flushed.

After vertex slots 430 is flushed data assembler 410 may set the mode to normal if a vertex index is received for a new primitive. In embodiments of the present invention, with more slots in vertex slots 430, the penalty for flushing vertex slots 430 without filling all of the slots increases. Therefore, it is desirable to resume processing in the normal mode whenever possible. Rather than flushing vertex slots 430 for each segment, vertex slots 430 are flushed for a state change or when a new incoming vertex will write into the slot of an as-yet unflushed vertex. However, the map mode is needed to allow per-vertex state changes by configuring vertex slots 430 as a random access storage buffer or a conventional round-robin streaming cache for the different modes.

The invention has been described above with reference to specific embodiments. Persons skilled in the art, however, will understand that various modifications and changes may be made thereto without departing from the broader spirit and scope of the invention as set forth in the appended claims. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. The foregoing description and drawings are, accordingly, to be regarded in an illustrative rather than a restrictive sense.

The invention claimed is:

1. A method for loading vertex slots with vertex information, comprising:
   receiving vertex information for one or more vertices of a primitive, wherein the vertex information is stored in a primitive buffer;
   emitting the vertex information for the one or more vertices of the primitive to vertex slots in a first multithreaded processing core to be processed according to a first vertex state;
   determining that a vertex state change has occurred within the primitive;
   in response to the vertex state change, flushing the vertex slots that store vertex information for one or more pending vertices in the first multithreaded processing core, wherein the vertex information, once flushed from the vertex slots, is transmitted to a programmable execution unit of the first multithreaded processing core for processing by a vertex shader program according to a first vertex state;
   configuring a second multithreaded processing core for processing one or more subsequent vertices of the primitive by the vertex shader program according to a second vertex state based on the vertex state change;
   copying the vertex information for the one or more vertices of the primitive from the primitive buffer to vertex slots in the second multithreaded processing core; and
   emitting vertex information for the one or more subsequent vertices of the primitive received after the vertex state change to vertex slots in the second multithreaded processing core to be processed according to the second vertex state.

2. The method of claim 1, further comprising the step of setting a vertex processing mode to a map mode when a vertex state change occurs within the primitive.

3. The method of claim 2, further comprising, when operating in the map mode, the step of determining an available slot that can be overwritten in the vertex slots of the second multithreaded processing unit.

4. The method of claim 3, further comprising the steps of overwriting the available slot with the vertex information for a subsequent vertex of the primitive received after the vertex state change.

5. The method of claim 2, further comprising the step of determining that the vertex processing mode can be changed from the map mode to the normal mode in order to configure the vertex slots of each of the one or more multithreaded processing cores as a round-robin streaming cache.

6. The method of claim 1, further comprising processing the vertices of the primitive using graphics processing operations to produce an image for display.

7. The method of claim 1, wherein the vertex information is an index specifying a location in a vertex cache configured to store vertex data.

8. The method of claim 1, wherein vertex information of an anchor vertex is copied from the primitive buffer to the vertex slots of the second multithreaded processing core.

9. The method of claim 1, wherein the primitive is a line loop with an anchor vertex.

10. The method of claim 1, wherein determining that the vertex state change has occurred within the primitive comprises:
- receiving a vertex processing command from an instruction stream buffer located in a memory associated with the one or more multithreaded processing cores; and
- determining that the vertex processing command modifies the configuration of the first multithreaded processing core to change how the one or more subsequent vertices of the primitive are processed.

11. A computing system for assembling vertex information, comprising:
- one or more multithreaded processing cores, wherein each multithreaded processing core includes a plurality of vertex slots and a programmable execution unit configured to process vertex information stored in the vertex slots according to a vertex shader program; and
- a data assembler coupled to the one or more multithreaded processing cores, the data assembler including a primitive buffer and configured to:
  - receive vertex information for one or more vertices of a primitive, wherein the data assembler stores the vertex information in a primitive buffer;
  - emit the vertex information for the one or more vertices of the primitive to vertex slots in a first multithreaded processing core to be processed according to a first vertex state;
  - determine that a vertex state change has occurred within the primitive;
  - in response to the vertex state change, flush the vertex slots that store vertex information for one or more pending vertices in the first multithreaded processing core, wherein the vertex information, once flushed from the vertex slots, is transmitted to the programmable execution unit of the first multithreaded processing core for processing by the vertex shader program according to a first vertex state;
  - configure a second multithreaded processing core for processing one or more subsequent vertices of the primitive by the vertex shader program according to a second vertex state based on the vertex state change;
  - copy the vertex information for the one or more vertices of the primitive from the primitive buffer to vertex slots in the second multithreaded processing core; and
  - emit vertex information for the one or more subsequent vertices of the primitive received after the vertex state change to vertex slots in the second multithreaded processing core to be processed according to the second vertex state.

12. The system of claim 11, wherein the data assembler is further configured to set a vertex processing mode to a map mode when the vertex state change occurs within the primitive.

13. The system of claim 12, wherein, when operating in the map mode, the data assembler is further configured to determine an available slot that can be overwritten in the vertex slots of the second multithreaded processing unit.

14. The system of claim 13, wherein the data assembler is further configured to overwrite the available slot with the vertex information for vertices of the primitive received subsequent to the vertex state change.

15. The system of claim 12, wherein the data assembler is further configured to determine that the vertex processing mode can be changed from the map mode to the normal mode in order to configure the vertex slots of each of the one or more multithreaded processing cores as a round-robin streaming cache.

16. The system of claim 11, wherein the one or more multithreaded processing cores are further configured to perform graphics processing operations to produce an image suitable for display.

17. The system of claim 11, wherein the vertex information written into each of the vertex slots of a particular multithreaded processing core is a batch that is processed independently of other batches written into other vertex slots of the other multithreaded processing cores.

18. The system of claim 11, wherein the data assembler is further configured to copy vertex information of an anchor vertex from the primitive buffer to the vertex slots of the second multithreaded processing core.

19. The system of claim 11, wherein the primitive is a line loop with an anchor vertex.

20. The system of claim 11, wherein determining that the vertex state change has occurred within the primitive comprises:
- receiving a vertex processing command from an instruction stream buffer located in a memory associated with the one or more multithreaded processing cores; and
- determining that the vertex processing command modifies the configuration of the first multithreaded processing core to change how the one or more subsequent vertices of the primitive are processed.

* * * * *